Patented Jan. 23, 1923.

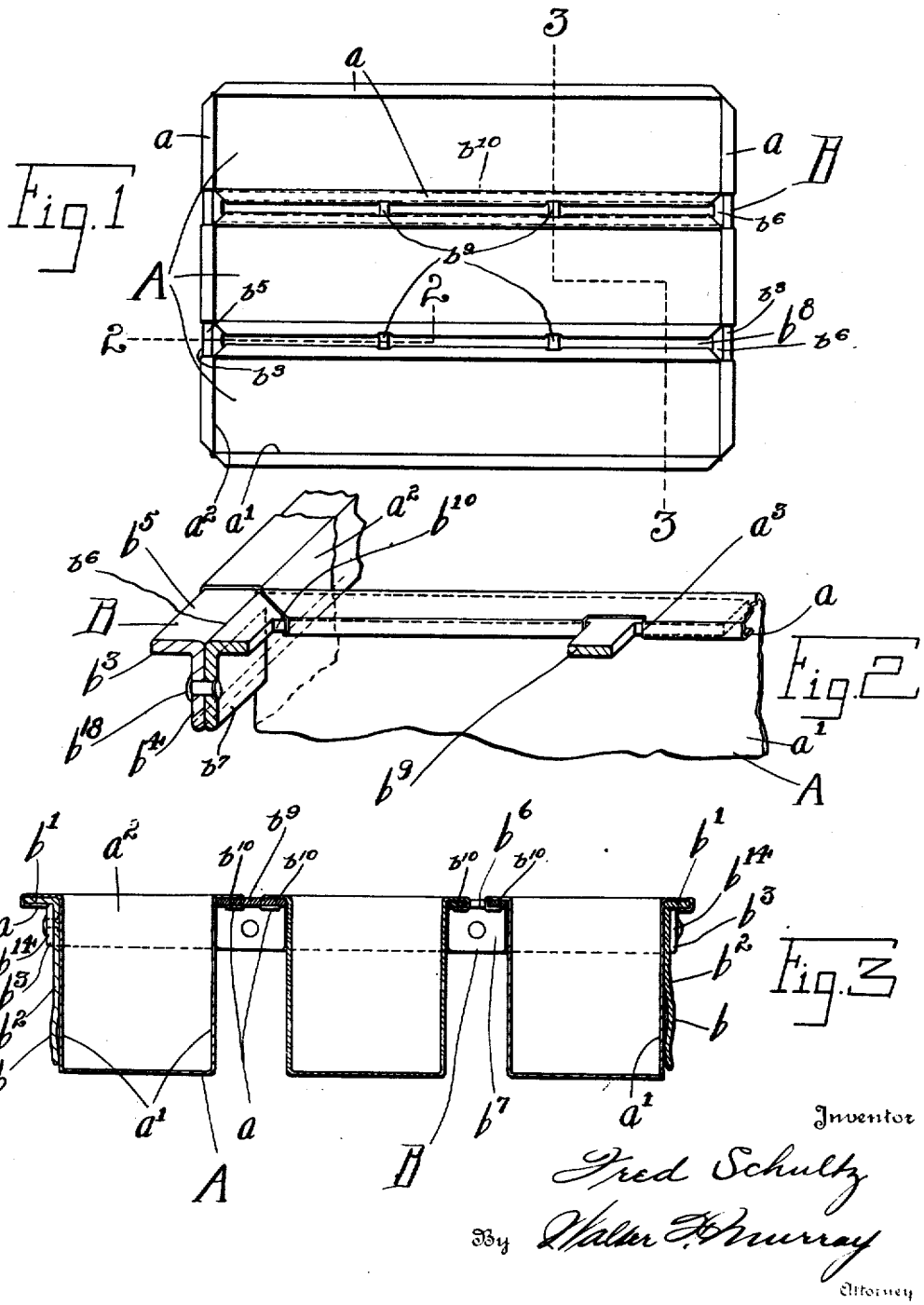

1,443,095

UNITED STATES PATENT OFFICE.

FRED SCHULTZ, OF CINCINNATI, OHIO, ASSIGNOR TO THE LOCKWOOD MANUFACTURING COMPANY, OF CINCINNATI, OHIO, A CORPORATION OF OHIO.

MULTIPLE BAKING PAN.

Application filed May 20, 1921. Serial No. 471,148.

*To all whom it may concern:*

Be it known that I, FRED SCHULTZ, a citizen of the United States of America, and a resident of Cincinnati, in the county of Hamilton and State of Ohio, have invented a new and useful Improvement in Multiple Baking Pans, of which the following is a specification.

This invention relates to baking pans and has for an object the production of new and improved means for securing a series of separate pans together for the purpose of forming a frame of pans, of such size that it may be conveniently and economically handled.

Another object of my invention is to provide means whereby the pans may be secured to one another in a simple and efficient form wherein the interior surface of the pans will be unbroken and imperforate.

Another object is to provide a reinforcement for all of the pans so that the pans will more readily withstand the rough, hard usage to which they are subjected.

Another object is to provide means for the purposes stated adapted to give the pans the maximum rigidity and to eliminate the employment of extra binders for the upper edges of the pans, such as the wire that is now disposed about the upper edges of the pans and about which the pan edges are curled.

Another object is to provide means for the purposes stated adapted to space the pans, and to provide air passages between adjacent pans without diminishing the rigidity with which the pans are held.

These and other objects are attained by the means described herein and disclosed in the accompanying drawings, in which Fig. 1 is a plan view of a series of pans secured to one another by means embodying my invention.

Fig. 2 is an enlarged perspective view on line 2—2 of Fig. 1.

Fig. 3 is an enlarged sectional view on line 3—3 of Fig. 1.

My invention contemplates a series of pans having their upper edges secured upon a frame adapted to give the desired rigidity to the entire structure, to secure the pans in spaced relation, to reinforce the pans so as to be able to withstand the roughest usage to which they will be subjected, and to protect the pans against this rough usage.

The pans A may be made in any form or manner and are provided with an unfinished upper edge $a$ extending from the sides $a'$ and ends $a^2$. These upper edges $a$ are adapted to be secured upon the frame B.

The frame B comprises the protector plates or shock absorber plates $b$ adapted to extend over the outer surfaces of the sides $a'$ of the endmost pans A of the series of pans. The upper edges $b'$ of the plates $b$ are bent at an angle to the body portions $b^2$ of the plates, whereby the shock absorber is given substantially the shape of the letter L. The upper edges $b'$ of plates $b$ form a binding edge or strip about which the upper edge $a$ formed on the one side of one of the pans A may be secured, thereby securing the pan side upon the frame B. The plates $b$ are secured in spaced relation by means of the end bars $b^3$ having substantially the form of an angle iron. A lug $b^{14}$ is formed upon the opposite ends of the side plates $b^4$ of the end bars. The lugs $b^{14}$ are secured upon the protector plates by suitable means such as rivets. The other or complementary side plates $b^5$ of the end bars are retained in substantial horizontal alignment with the binding strips $b'$ formed on the shock absorber. The upper edges $a$ formed on the ends of the pans A are bent over the side plates $b^5$ in the same manner in which the upper edges formed on the outer sides of the endmost pans are bent over the binding strips $b'$ on the shock absorbers, thereby securing the pan ends upon the frame B. Side bars or cross bars $b^6$ are mounted upon the end bars and extend between adjacent pans. The side bars have downwardly projecting lugs $b^7$ formed upon their opposite ends. The side bars or cross bars have formed in them, intermediate the lugs $b^7$, the longitudinal slots $b^8$ whereby the sides of the side bars are developed into support arms $b^{10}$, one of each of which is adapted to assume a position immediately adjacent the adjacent sides of adjacent pans. The lugs $b^7$ are secured upon the side plates $b^4$ of the end bars by any suitable means such as rivets $b^{18}$. The upper surfaces of the side bars are disposed in substantially horizontal alignment with the side plates $b^5$ of the end bars $b^3$. A series of braces $b^9$ extend between the support arms $b^{10}$. The edges formed on the adjacent sides of adjacent pans are bent over the support arms $b^{10}$ formed on the side bars, thereby securing the pan sides upon frame B. Notches $a^3$ are formed in the edges $a$ of the pans adapted to be bent about the support arms $b^{10}$, the notches accommodating the braces $b^9$.

The frame B is constructed and the pans are then secured thereupon by bending the upper edges of the pans' sides and ends over the frame, wherefor the rigidity of the frame is accorded the pans, thereby spacing the pans in a firm rigid relation without mutilating the pans in any way and without breaking the interior surface of the pans. The frame B also serves as a binder for the upper edges of the pans, thereby dispensing with the wire binders now used about the upper edges of the pans. New pans can be readily mounted on the frame by loosening the pan edges from the frame and inserting a new pan in place of the pan that was removed.

It should be observed that the binding strip $b'$ and the side plates $b^5$ provide suitable guides and retaining means for sliding covers that are often used with baking pans when using the pans for baking articles requiring a cover during any part of the baking process.

What I claim is:

1. In a multiple baking pan the combination of a frame comprising protector plates, end bars mounted on and spacing the protector plates, side bars mounted on the end bars providing a series of openings between the protector plates, and a pan extending through each opening between the protector plates, the pans having their upper edges secured upon the protector plates, the end bars and the side bars, whereby the pans are rigidly mounted upon and spaced by the frame, and the protector plates extend over the outer sides of the endmost pans.

2. In a multiple baking pan the combination of a frame comprising protector plates, each adapted to extend over the side of an individual baking pan, a binding strip formed on the end of each plate extending longitudinally thereof and adapted to assume a position adjacent and to extend in substantial parallelism with the upper edge of the side of an individual baking pan, end bars having substantially the form of an angle iron, one of the side plates of each of the end bars being mounted upon and spacing the protector plates, the second side of each of the end bars extending in substantial alignment with and between the binding strips formed on the protector plates, side bars mounted on the end bars comprising spaced support arms extending between the end bars in substantial alignment with the binding strips, and individual baking pans having their upper ends turned over the binding strips, the support arms and the second mentioned side plates of the end bars.

3. In a multiple baking pan the combination of a frame comprising protector plates, each adapted to extend over the side of an individual baking pan, a binding strip formed on the end of each plate extending longitudinally thereof and adapted to assume a position adjacent to and to extend in substantial parallelism with the upper edge of the side of an individual baking pan, end bars having substantially the form of an angle iron, one of the side plates of each of the end bars being mounted upon and spacing the protector plates, the second side of each of the end bars extending in substantial alignment with and between the binding strips formed on the protector plates, side bars mounted on the end bars comprising spaced support arms extending between the end bars in substantial alignment with the binding strips, braces extending between the support arms on each side bar, and individual baking pans having their upper ends turned over the binding strips, the support arms and the second mentioned side plates of the end bars.

4. In a multiple baking pan the combination of a frame comprising protector plates, each adapted to extend over the side of an individual baking pan, a binding strip formed on the end of each plate extending longitudinally thereof and adapted to assume a position adjacent to and to extend in substantial parallelism with the upper edge of the side of an individual baking pan, end bars having substantially the form of an angle iron, lugs formed on opposite ends of one side plate of each of the end bars adapted to be mounted upon the protector plates and to thereby space the protector plates and to dispose the second side of the end bars in alignment with the binding strips on the protectors, side bars having slots extending longitudinally of the side bars, whereby spaced support arms are formed on the side bars, lugs on the ends of the side bars adapted to be mounted on the end bars and to dispose the side bars in substantial alignment with the binding strips, and individual pans extending between the end bars, the protector plates and the side bars, and having their upper ends secured upon the binding strips, the second mentioned side plates of the end bars and upon the support bars.

5. In a multiple baking pan the combination of a frame comprising protector plates, each adapted to extend over the side of an individual baking pan, a binding strip formed on the end of each plate extending longitudinally thereof and adapted to assume a position adjacent to and to extend in substantial parallelism with the upper edge of the side of an individual baking pan, end bars having substantially the form of an angle iron, lugs formed on opposite ends of one side plate of each of the end bars adapted to be mounted upon the protector plates and to thereby space the protector plates and to dispose the second side of the end bars in alignment with the binding strips on the protectors, side bars having slots extending longitudinally of the side bars, whereby spaced support arms are formed on the side bars, braces extending between the support arms, lugs on the ends of the side bars adapted to be mounted on the end bars and to dispose the side bars in substantial alignment with the binding strips and individual pans extending between the end bars, the protector plates and the side bars, and having their upper ends secured upon the binding strips, the second mentioned side plates of the end bars and upon the support bars.

6. The combination of bake pans placed side by side, and a single rigid intermediate side bar comprising a strip of metal having a series of longitudinal slots, the edges of the pans engaging the opposite edges of the side bar.

7. The combination of bake pans placed side by side, a single rigid intermediate side bar comprising a strip of metal having down-turned ends and a series of longitudinal slots between said ends, a frame extending around the pans, the downturned ends on the side bar being secured upon the frame, and the edges of the pans engaging opposite edges of the side bars and the frame.

8. The combination of a series of pans located side by side and all of the pans having unfinished walls, and a rigid frame comprising longitudinally slotted cross bars extending adjacent all of the unfinished upper edges of all of the pans and upon which the upper edges of all of the pans are secured, the frame being adapted to rigidly space the pans and to provide vertical air passages between adjacent pans.

In testimony whereof, I have hereunto subscribed my name this 18th day of May, 1921.

FRED SCHULTZ.